(12) United States Patent
Hsu

(10) Patent No.: US 6,322,027 B1
(45) Date of Patent: Nov. 27, 2001

(54) ADJUSTABLE SPRINKLER STAND

(76) Inventor: Ching-Tien Hsu, No. 90-10, Lane 347, Ta-Tien Rd., Nan-Tien, Li, Ho-Mei Township, Chang-Hua Hsien (TW)

( * ) Notice: Subject to any disclaimer, the term of this patent is extended or adjusted under 35 U.S.C. 154(b) by 0 days.

(21) Appl. No.: 09/603,771

(22) Filed: Jun. 26, 2000

(51) Int. Cl.⁷ .......................... F16M 11/02; B05B 15/06
(52) U.S. Cl. .................................. 248/177.1; 239/280.5; 248/83; 248/188.7
(58) Field of Search ...................... 211/127.1; 248/177.1, 248/75–76, 80, 83, 85–86, 186.1, 187.1, 169, 171, 88, 163.1, 150–151, 370, 166, 188.6, 188.7; 239/200, 279, 280, 280.5, 281, 273, 275

(56) References Cited

U.S. PATENT DOCUMENTS

| | | | |
|---|---|---|---|
| 729,291 | * | 5/1903 | Dickerson . |
| 807,184 | * | 12/1905 | Malnburg . |
| 1,064,798 | * | 6/1913 | Walte . |
| 1,187,349 | * | 6/1916 | Libby . |
| 1,674,493 | * | 6/1928 | Adams . |
| 1,694,600 | * | 12/1928 | Richey ..................... 299/47 |
| 1,906,991 | * | 5/1933 | McTernan . |
| 1,959,886 | * | 5/1934 | Wadsworth ............... 248/29 |
| 2,493,978 | * | 1/1950 | Kromer ..................... 248/166 |
| 2,709,560 | * | 5/1955 | Resk ........................ 248/169 |
| 3,282,545 | * | 11/1966 | Bieschke ................... 248/171 |
| 3,982,284 | * | 9/1976 | Becker ..................... 248/146 |
| 4,196,884 | * | 4/1980 | Davidson .................. 248/157 |
| 4,324,477 | * | 4/1982 | Miyazaki .................. 248/168 |
| 4,824,020 | * | 4/1989 | Harward .................... 239/264 |
| 4,884,749 | * | 12/1989 | Ruprechter ............... 239/280.5 |
| 4,988,063 | * | 1/1991 | Pucillo ..................... 248/163.1 |
| 4,993,635 | * | 2/1991 | Dupre ...................... 239/276 |
| 5,267,712 | * | 12/1993 | Shen ....................... 248/179 |
| 5,503,357 | * | 4/1996 | Johnson et al. ........... 248/188.5 |
| 5,509,629 | * | 4/1996 | Sassmannshausen et al. ...... 248/171 |
| 5,836,516 | * | 11/1998 | Van Epps et al. ......... 239/280.5 |
| 6,003,823 | * | 12/1999 | Hoffman .................. 248/163.2 |

* cited by examiner

Primary Examiner—Jerry Redman
Assistant Examiner—Jennifer E. Novosad
(74) Attorney, Agent, or Firm—Harrison & Egbert

(57) ABSTRACT

An adjustable sprinkler stand including a sprinkler mount which is supported by three support rod sets and is provided with a threaded through hole for engaging at the top end thereof with a sprinkler and at the bottom end thereof with a water supply tube in conjunction with a connection seat slidably fitted over the water supply tube. The support rod sets are adjustable and formed of an outer tube, an inner tube slidably fitted into the outer tube, and a leg tube fitted into the inner tube. The outer tube and the inner tube are provided with a locating member which is pivoted with one end of a connection rod such that other end of the connection rod is fastened pivotally to the connection seat.

1 Claim, 7 Drawing Sheets

ADJUSTABLE SPRINKLER STAND

BACKGROUND OF THE INVENTION

The present invention relates generally to a sprinkling implement, and more particularly to an adjustable sprinkler stand.

DESCRIPTION OF RELATED ART

As shown in FIG. 1, a sprinkler stand of the prior art comprises a main body 10 and a plurality of support rods 11. The support rods 11 are curved so as to keep the main body 10 at a certain level. A sprinkler is fastened to the main body 10. The support rods 11 can not be adjusted in height, the main body 10 is therefore located at a fixed level. As a result, the sprinkler is also located at a fixed level, thereby resulting in limiting in the sprinkling range of the sprinkler.

BRIEF SUMMARY OF THE INVENTION

The primary objective of the present invention is to provide an adjustable sprinkler stand comprising a sprinkler mount which is supported by three adjustable support rods and can be thus set at a desired level to facilitate the sprinkling of water efficiently.

The foregoing objective, features and the advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
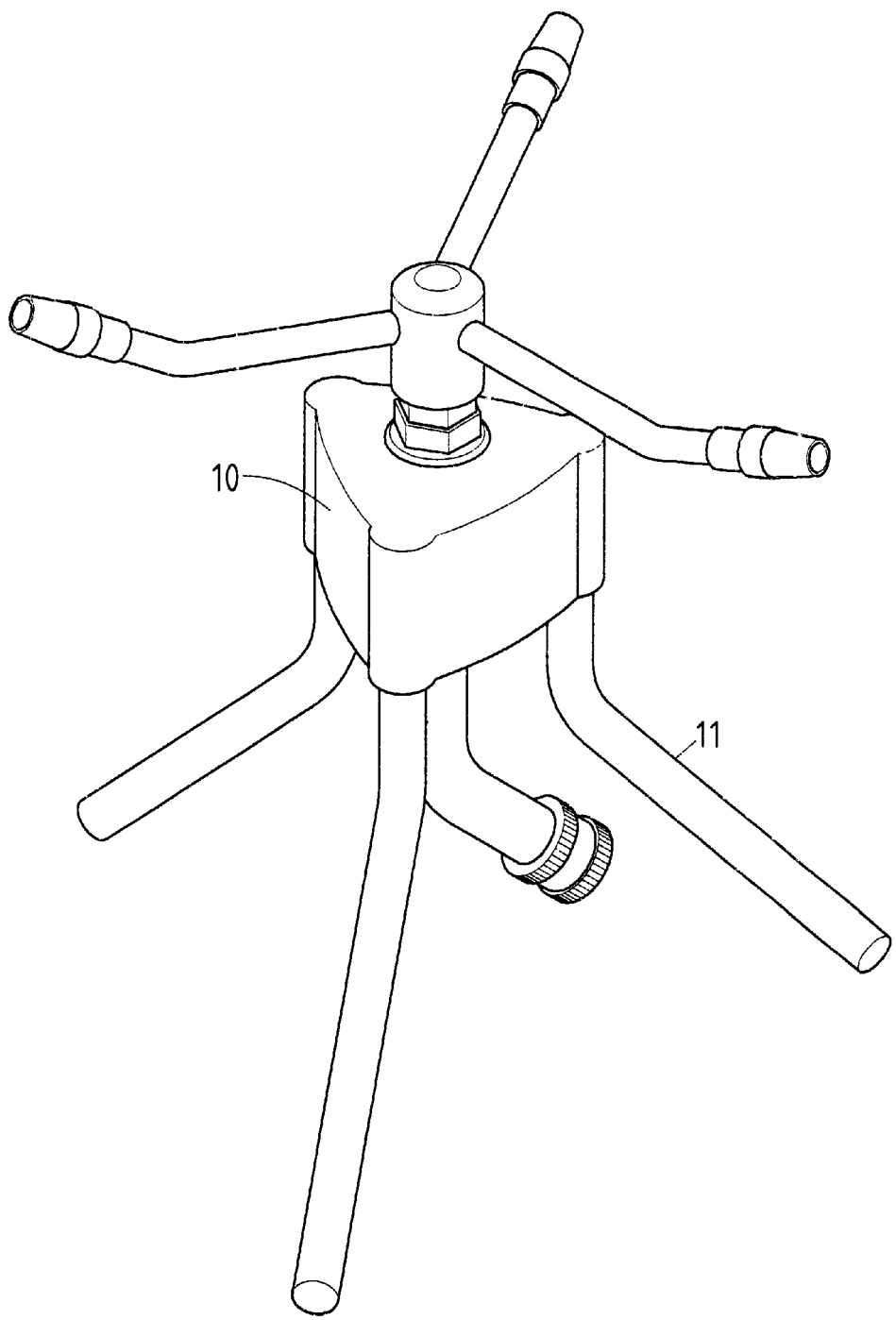
FIG. 1 shows a perspective view of a sprinkler stand of the prior art.
Figure 2:
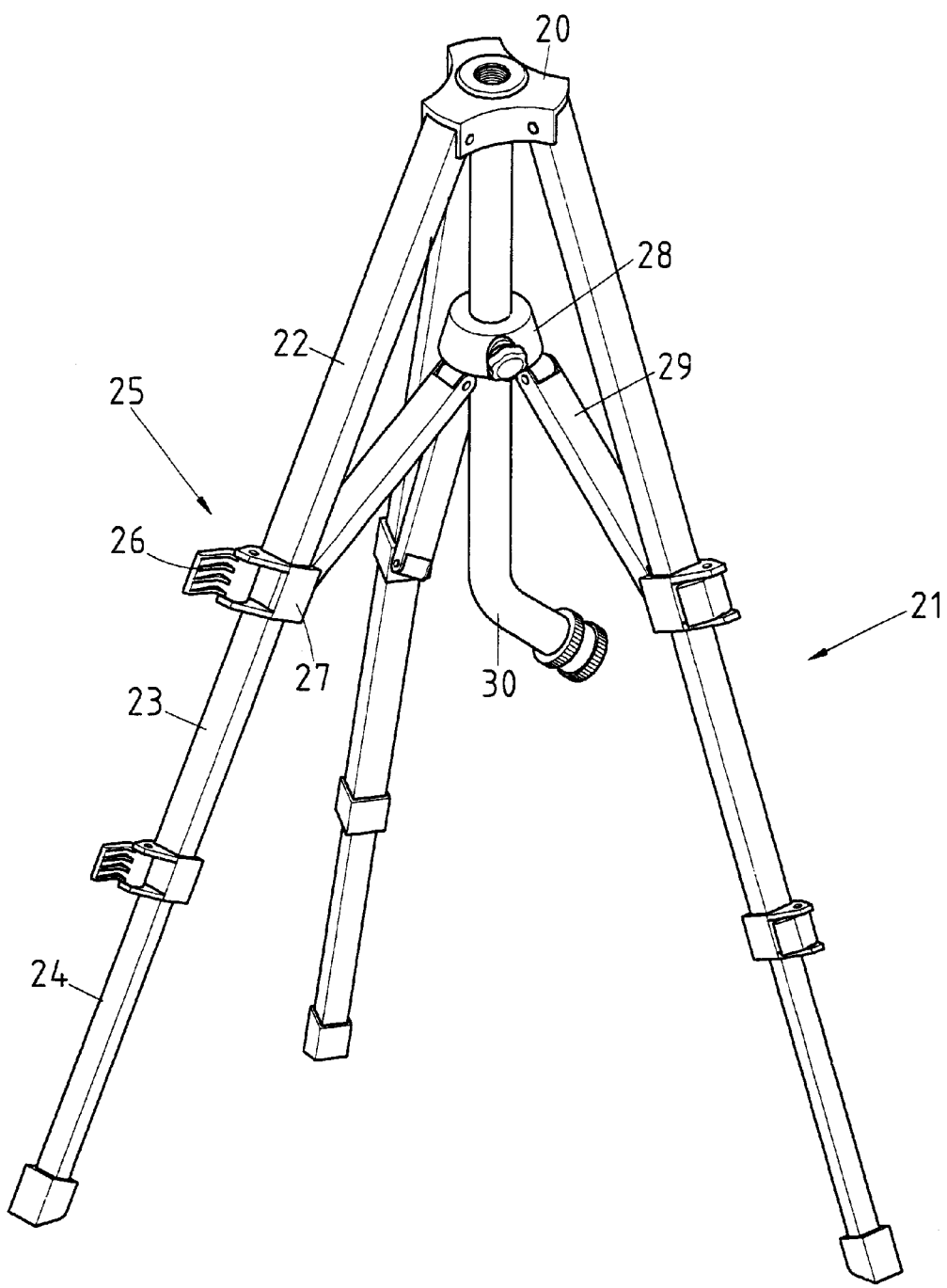
FIG. 2 shows a perspective view of a preferred embodiment of the present invention.
Figure 3:
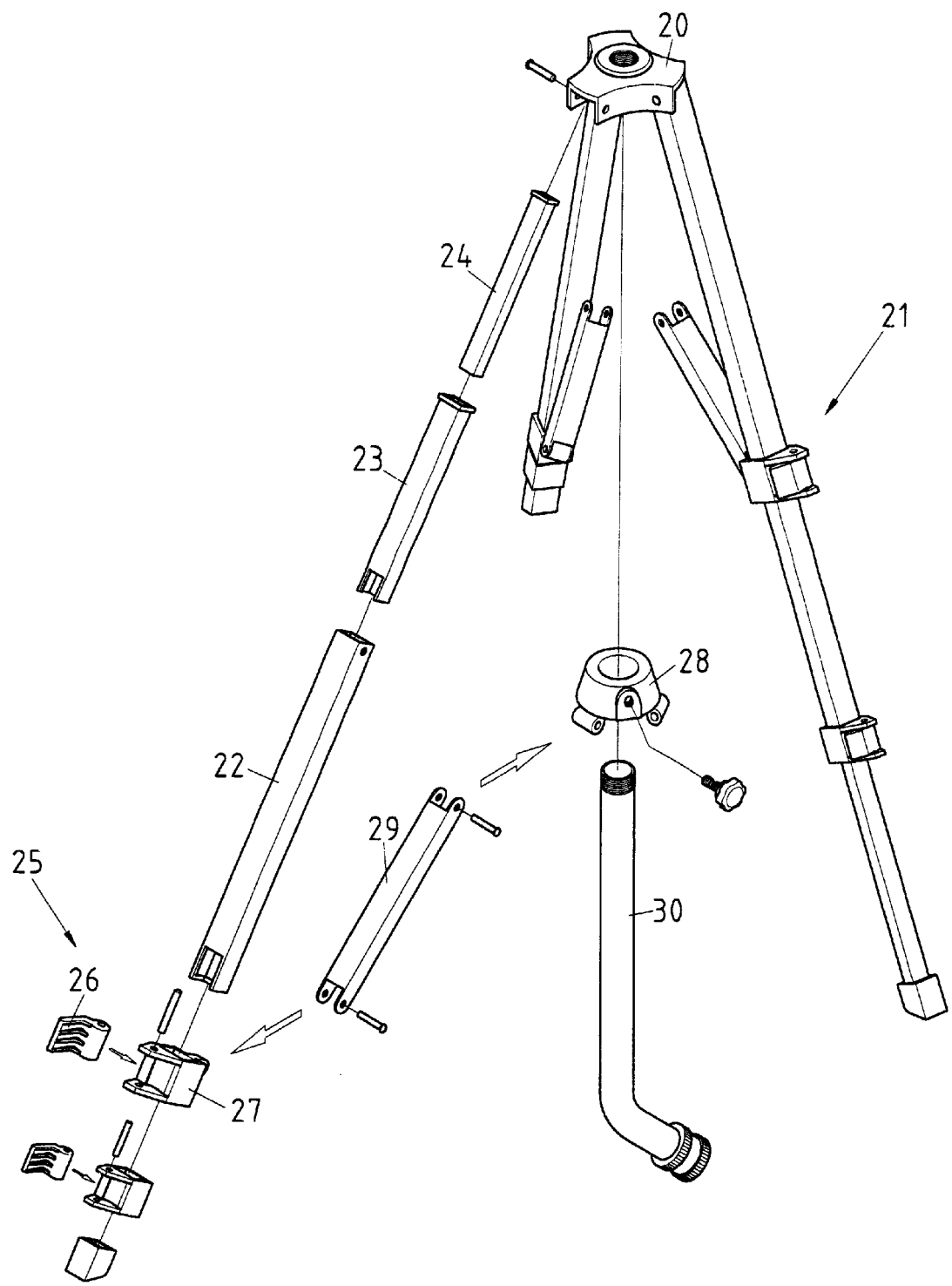
FIG. 3 shows an exploded view of the preferred embodiment of the present invention.
Figure 4:
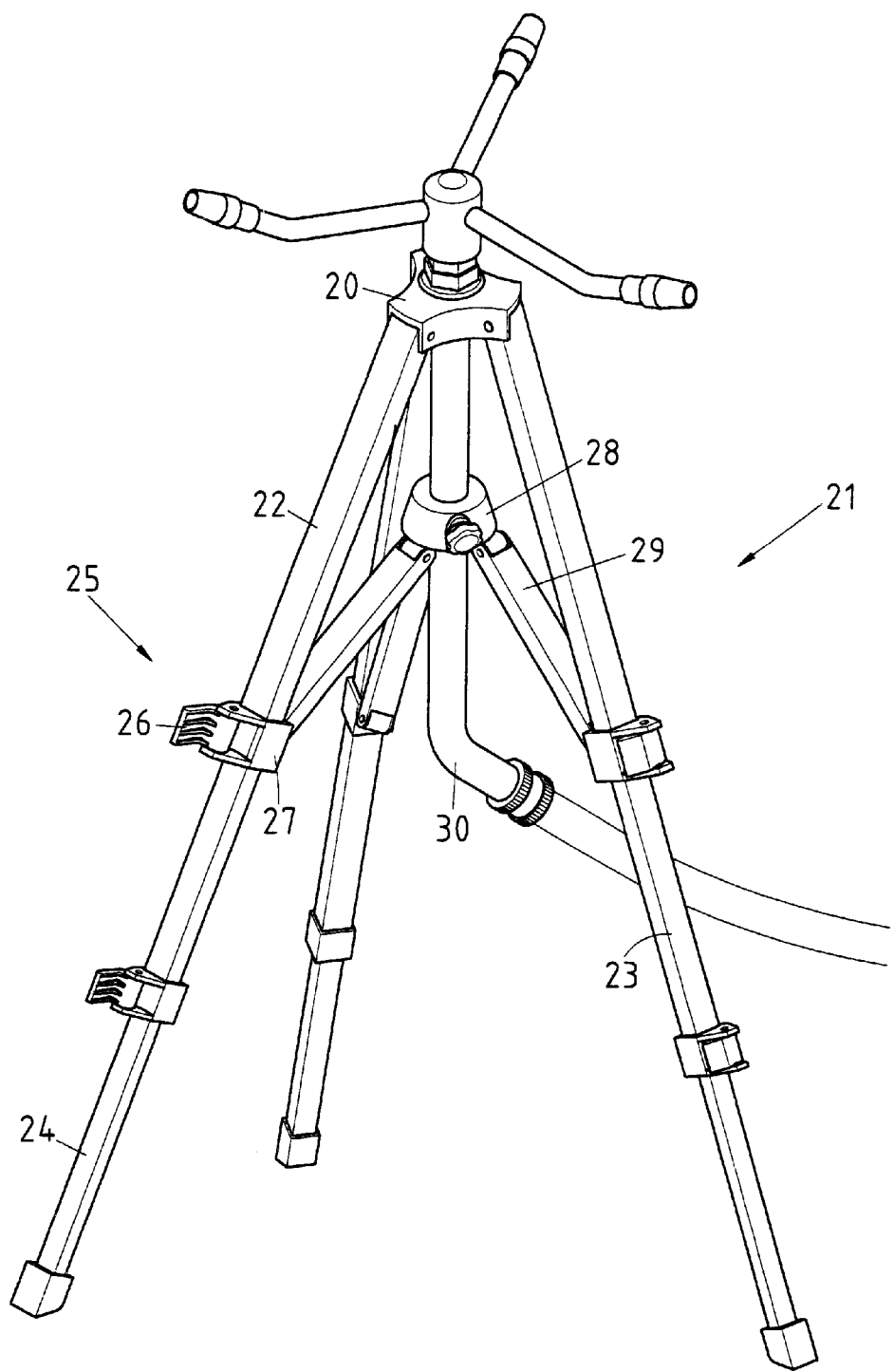
FIG. 4 shows a schematic view of the preferred embodiment of the present invention in use.

As shown in FIGS. 2–8, an adjustable sprinkler stand embodied in the present invention comprises a sprinkler mount 20, three support rod sets 21, a plurality of locating members 25, a connection seat 28, and a plurality of connection rods 29.

The sprinkler mount 20 is provided with a threaded through hole for engaging at the top end thereof with a sprinkler and at the bottom end thereof with a water supply tube 30. The sprinkler mount 20 is located at the top ends of the three support rod sets 21.

Each of the three support rod sets 21 is formed of an outer tube 22, an inner tube 23 slidably fitted into the outer tube 22, and a leg tube 24 fitted into the inner tube 23.

The locating members 25 are respectively disposed at the fitting ends of the outer tube 22 and the inner tube 23. Each of the locating members 25 is formed of a locating sleeve 27 and an adjustment piece 26.

The connection seat 28 is used to facilitate the fastening of the water supply tube 30 to the sprinkler mount 20. The connection seat 28 is slidably fitted over the water supply tube 30.

Each of the connection rods 29 is pivoted at one end with the connection seat 28, and at other end with the location sleeve 27 which is fitted over one end of the outer tube 22.

Figure 5:
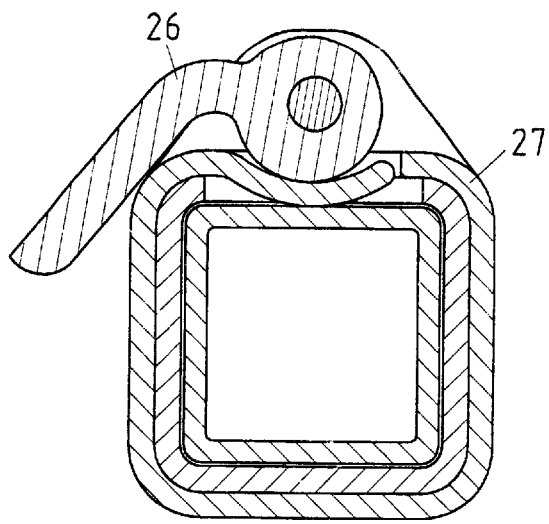
FIG. 5 shows a sectional view of a locating member of the preferred embodiment of the present invention in the state of being located.
Figure 6:
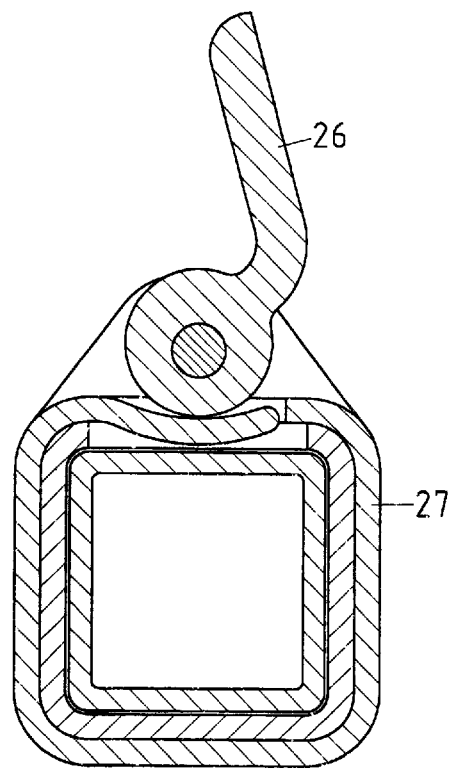
FIG. 6 shows a sectional schematic view of the locating member of the preferred embodiment of the present invention in the state of being adjusted.
Figure 7:
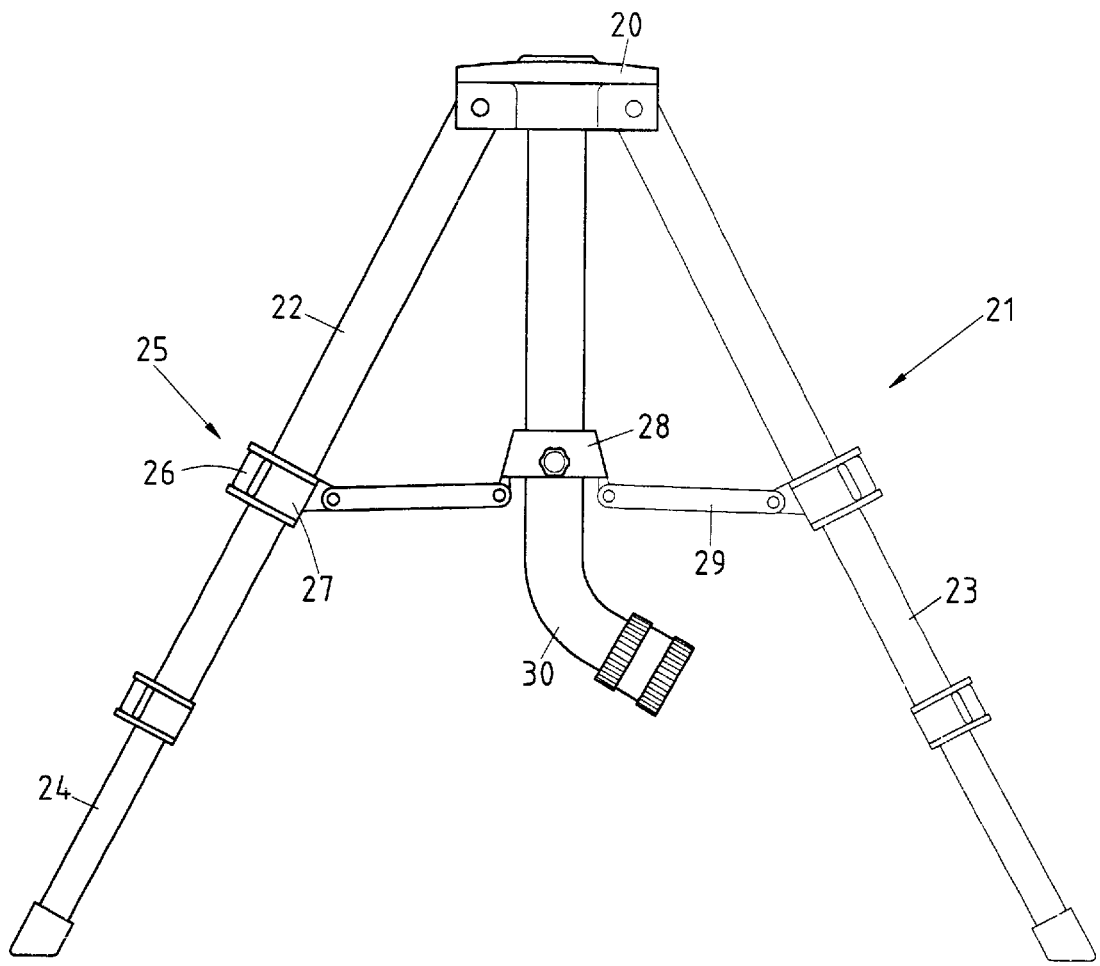
FIG. 7 shows a side schematic view of the preferred embodiment of the present invention in the unfolded state.
Figure 8:
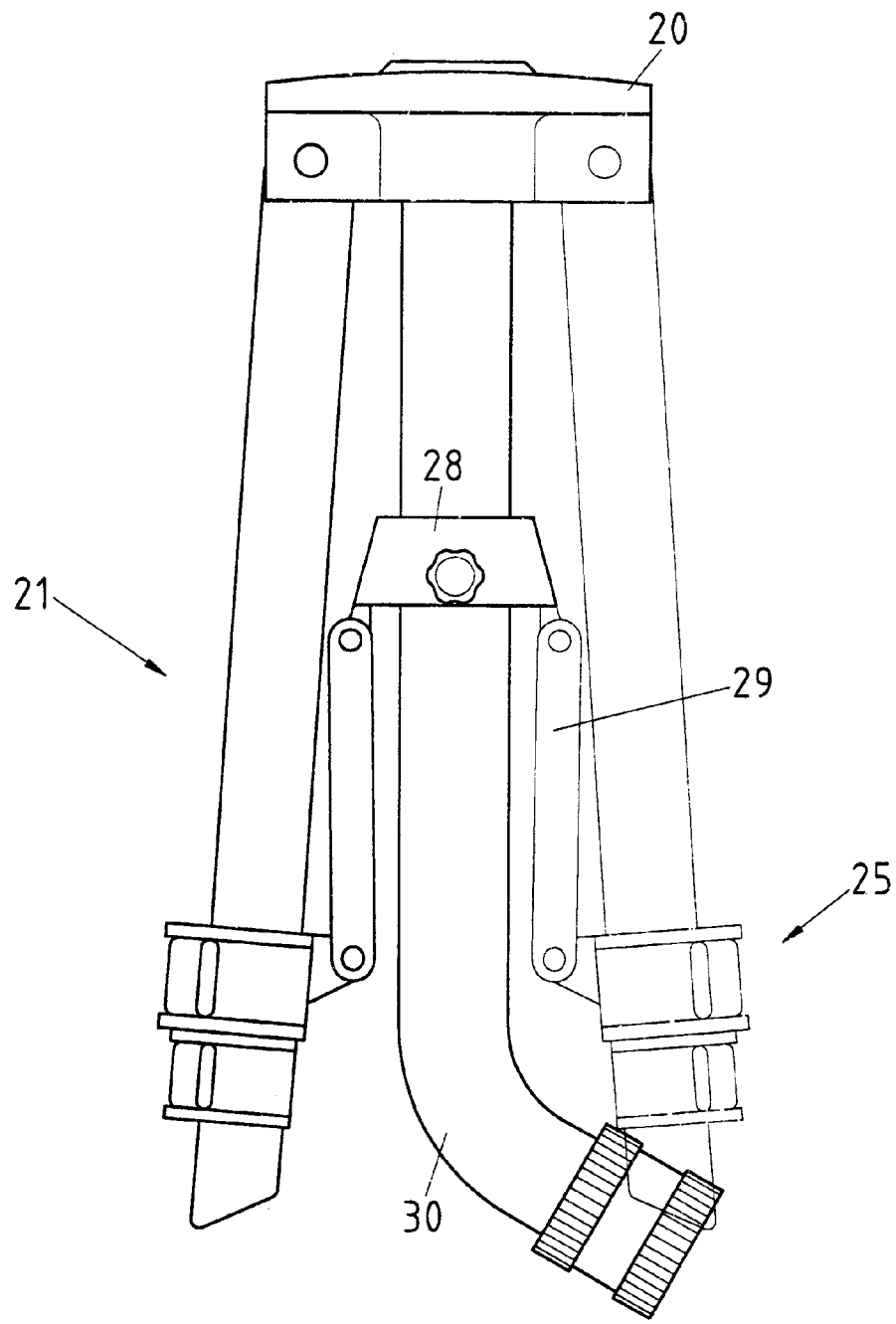
FIG. 8 shows a side schematic view of the preferred embodiment of the present invention in the folded state.

In light of the telescopic construction of the support rod sets 21, each support rod set 21 can be adjusted in length. Upon having been adjusted in length, the support rod set 21 is fixed in length by the locating member 25. The pivoting portion of the adjustment piece 26 of the locating member 25 has a cross section of an eccentric circle. When the adjustment piece 26 is turned upwards, as shown in FIG. 6, the distance between the eccentric circle and the center of rotation is the shortest. In the meantime, the locating sleeve 27 of the locating member 25 comes in contact with the eccentric circle. As a result, there is a gap between the locating sleeve 27 and the support rod to be located, as shown in FIG. 6. The gap is the difference between the maximum distance and the minimum distance of the contact point of the eccentric circle and the center of rotation. The support rod set 21 is thus in the state of adjustment. On the other hand, when the adjustment piece 26 is turned downwards, the distance between the contact point of the eccentric circle and the center of rotation becomes gradually greater, thereby causing the locating sleeve 27 to be pressed against by the adjustment piece 26 so as to press securely against the support rod to be located, as shown in FIG. 5. In light of the connection rods 29 being moved along with the connection seat 28, one end of the connection rod 29 moves downward along with the connection seat 28 at the time when the connection seat 28 is moved downward along the water supply tube 30. As a result, the support rod sets 21 are forced by other ends of the connection rods 29 to expand outwards, as shown in FIG. 7. As a result, the sprinkler mount 20 can be adjusted to locate at a desired level.

What is claimed is:

1. An adjustable sprinkler stand comprising:

a sprinkler mount provided with a threaded through hole for engaging at a top end thereof with a sprinkler and at a bottom end thereof with a water supply tube;

a plurality of support rod sets for supporting said sprinkler mount whereby said support rod sets are formed of an outer tube, an inner tube slidably fitted into said outer tube, and a leg tube fitted into said inner tube;

a plurality of locating members disposed at fitting ends of said outer tube and said inner tube and formed of a locating sleeve and an adjustment piece;

a connection seat adapted to facilitate the fastening of the water supply tube to said sprinkler mount in such a manner that said connection seat is slidably fitted over the water supply tube; and a plurality of connection rods pivoted at one end with said connection seat, and at an opposite end with said locating sleeve which is fitted over one end of said outer tube.

* * * * *